United States Patent
Abersfelder et al.

(12) United States Patent (10) Patent No.: US 6,346,340 B1
(45) Date of Patent: Feb. 12, 2002

(54) CURRENT GENERATING SYSTEM FOR A VEHICLE HAVING AN INTERNAL COMBUSTION ENGINE

(75) Inventors: Günter Abersfelder, Sindelfingen; Helmut Buchner, Baltmannsweiler, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 08/672,065

(22) Filed: Jun. 26, 1996

(30) Foreign Application Priority Data

Jun. 26, 1995 (DE) .......................... 195 23 109

(51) Int. Cl.[7] .......................... H01M 8/02; H01M 8/06; B60K 25/08
(52) U.S. Cl. .......................... 429/12; 180/53.8; 429/13; 429/17; 429/19
(58) Field of Search .......................... 429/17, 19, 34, 429/13, 12; 180/65.2, 65.8, 53.8; 123/2

(56) References Cited

U.S. PATENT DOCUMENTS

| | | | |
|---|---|---|---|
| 4,199,713 A | 4/1980 | Förster | .......................... 322/2 |
| 4,489,242 A | 12/1984 | Worst | .......................... 307/10 R |
| 4,650,729 A * | 3/1987 | Nakamura et al. | .......................... 429/90 X |
| 5,248,566 A * | 9/1993 | Kumar et al. | .......................... 429/19 |
| 5,284,717 A * | 2/1994 | Yamase et al. | .......................... 429/17 |
| 5,346,778 A * | 9/1994 | Ewan et al. | .......................... 429/19 |
| 5,401,589 A * | 3/1995 | Palmer et al. | .......................... 429/13 |
| 5,482,790 A * | 1/1996 | Yamada et al. | .......................... 429/19 X |

FOREIGN PATENT DOCUMENTS

| | | |
|---|---|---|
| DE | 24 17 436 | 10/1975 |
| DE | 34 34 532 | 2/1986 |
| DE | 35 28 673 | 10/1987 |

* cited by examiner

*Primary Examiner*—John S. Maples
(74) *Attorney, Agent, or Firm*—Crowell & Moring LLP

(57) ABSTRACT

In an electric generating arrangement for a motor vehicle driven by an internal combustion engine, a fuel cell is provided to generate electric energy for operating electric consuming devices. For supplying the fuel cell with fuel, hydrogen gas is cracked from the liquid fuel for the internal combustion engine, and the remaining fuel constituents are either burnt directly in the internal combustion engine, or returned as a liquid condensate into the fuel tank.

4 Claims, 1 Drawing Sheet

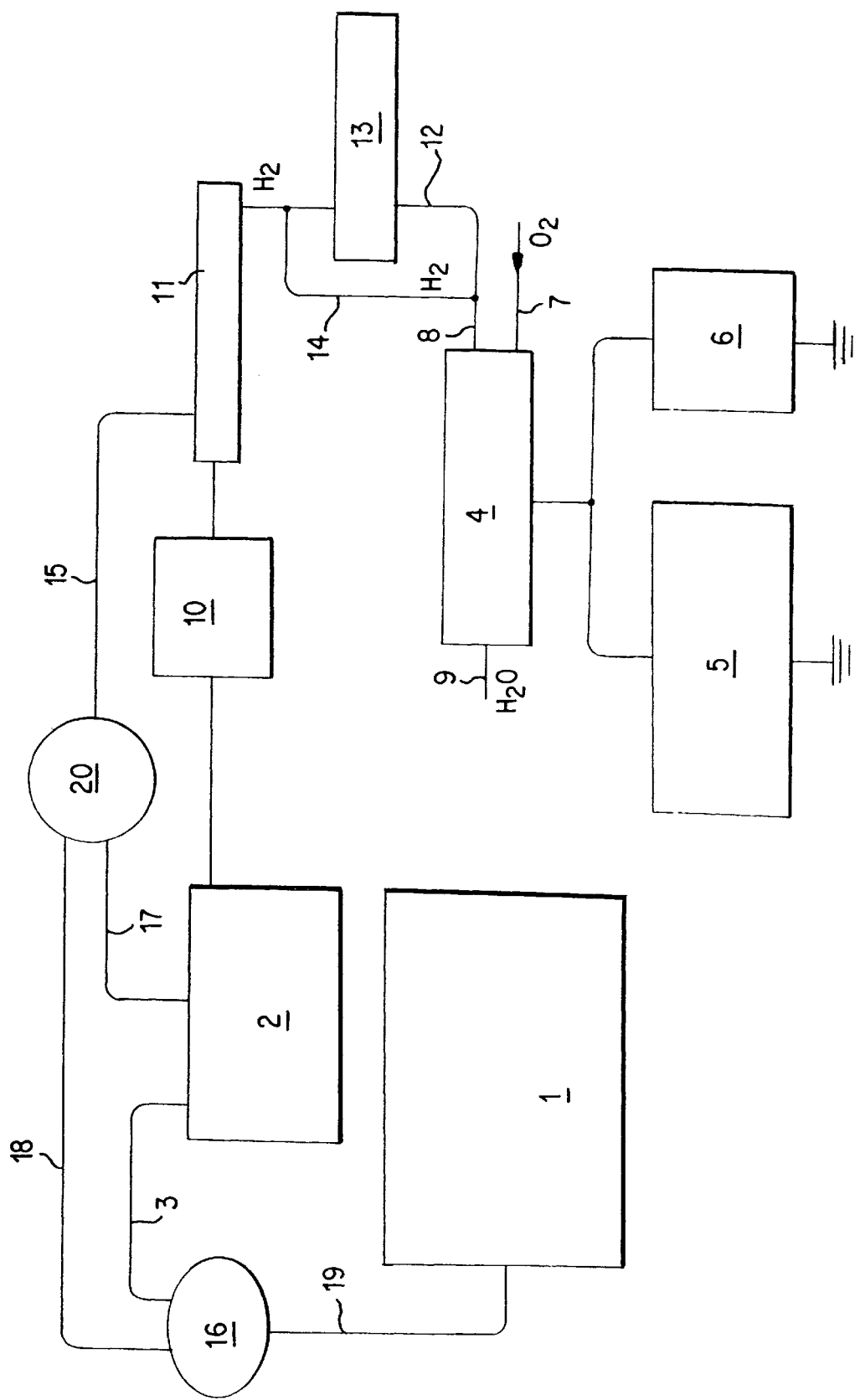

CURRENT GENERATING SYSTEM FOR A VEHICLE HAVING AN INTERNAL COMBUSTION ENGINE

BACKGROUND AND SUMMARY OF THE INVENTION

This invention relates to an electric current generator system for a vehicle having an internal combustion engine, as well as to a process for operating such a system.

For generating electric energy in conventional vehicles, a generator is driven by the internal combustion engine. The current supplied by the generator is, on the one hand, provided to the electric consuming devices in the vehicle. On the other hand, the generator is also used to charge the vehicle battery.

It is an object of the present invention to provide an electric generator system for a vehicle having an internal combustion engine, which can provide current for the electric consuming devices independently of the momentary rotational speed of the internal combustion engine, and which reduces fuel consumption. In addition, it is an object of the invention to provide a process for operating such a system.

This object is achieved according to the present invention, by the use of a fuel cell system instead of a generator in a vehicle having an internal combustion engine. Because of the better efficiency of the fuel cell, this arrangement has the advantage that the required current can be provided, while the fuel consumption is clearly reduced. In addition, the power of the fuel cell can be adjusted independently of the rotational speed of the internal combustion engine so that the momentarily generated electric power can be adapted to the currently existing requirement. When using such a system, it is advantageous to replace mechanical drives of auxiliaries, such as fans or air-conditioning compressors by electric drives, so that fuel consumption can be further reduced.

Finally, a fuel cell can also provide electric current when the internal combustion engine is switched off, so that improvements become possible, for example, with respect to the air-conditioning of the vehicle.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing is a schematic block diagram of an electric generating system according to the invention.

DETAILED DESCRIPTION OF THE DRAWING

Referring to the FIGURE, the vehicle (not shown) is driven by means of an internal combustion engine 1, which is supplied with liquid fuel from a fuel tank 2 via a fuel pipe 3. For generating electric energy, a fuel cell 4, preferably, an $H_2/O_2$-fuel cell with a proton-conducting membrane (referred to herein as a PEM-cell) is arranged on the vehicle. Naturally, different fuel cell systems may also be used.

First and second feed pipes 7, 8 supply oxygen and hydrogen gas respectively, to the PEM-cell 4. During an electrochemical reaction, in which the hydrogen is oxidized on the anode and the oxygen is reduced on the cathode, a voltage is generated between the two electrodes. To provide a desired electric power, many such cells may be combined by connecting them in parallel or in series to form a so-called stack. When pure hydrogen and oxygen are used, the PEM-cell 4 yields only residual oxygen and water by way of an outlet pipe 9.

In this type of use in a vehicle, atmospheric oxygen is fed to the PEM-cell 4. The required hydrogen is preferably obtained by separation from the fuel used for the internal combustion engine 1. (Normal fuels, such as diesel fuel, regular gasoline or methanol contain hydrocarbons from which, in a relatively simple manner— for example, by means of a cracking system 10—hydrogen can be separated; the precise construction of such cracking systems 10 is known in principle and is therefore not further described.) In contrast to known arrangements, in which a decomposition of the fuel into hydrogen is as complete as possible so that a clean residual gas is then discharged to the environment, in the case of the illustrated arrangement, preferably only a portion of the hydrogen is separated from the fuel and the remaining fuel constituents are then further utilized in the internal combustion engine 1.

The separation of the hydrogen from the remaining fuel constituents takes place in an $H_2$-separating system 11, the separated hydrogen being fed to the PEM-cell 4 by way of a supply pipe 12, in which an intermediate $H_2$-storage device 13 may be also be arranged. On the one hand, this intermediate $H_2$-storage device may be used to supply hydrogen to the PEM-cell 4 during the vehicle start, until the hydrogen supply by way of the cracking system 10 is operative. On the other hand, it is also possible to continue to operate the PEM-cell 4 to provide electric energy when the internal combustion engine 1 is switched off, for which hydrogen from the intermediate $H_2$-storage device 13 is supplied. In the normal operation, hydrogen can then also be supplied directly from the $H_2$-separating system 11 to the PEM-cell 4, by way of a bypass pipe 14, bypassing the intermediate $H_2$-storage device 13. Separation of the hydrogen from the residual fuel constituents, may be performed by means of any of numerous prior art devices 11, such, as for example, on the basis of metal foils.

The fuel constituents remaining in the $H_2$-separating system 11 are discharged by way of a disposal pipe 15. Several possibilities exist for utilizing these fuel constituents. Liquid constituents may be returned to the fuel tank 2 by a pipe 17. Gaseous constituents may be supplied to the internal combustion engine 1 by way of a pipe 18, either directly or preferably by way of a mixture forming device 16, which is connected with the fuel pipe 3, and with the internal combustion engine 1, the latter by way of another pipe 19.

In the disposal pipe 15, an intermediate storage device 20 may also be provided for the remaining fuel constituents. This arrangement has the advantage that the remaining fuel constituents can be intermediately stored, and may be supplied to the internal combustion engine 1 only as required. If the PEM-cell 4 must also be operated when the internal combustion engine 1 is inoperative, the use of such an intermediate storage device 20 is particularly advantageous. In the intermediate storage device 20, the fuel constituents may be completely or partly condensed and supplied to the fuel tank 2. The gaseous fuel constituents are then supplied to the internal combustion engine 1, again by way of the mixture forming device 16.

In addition to the above-described process which utilizes cracking system 10, other processes may of course be used to separate hydrogen partly or completely from the fuel, for example, also by reforming the fuel.

The current generated by the PEM-cell 4 is supplied to the electric consuming devices 5 in the vehicle. In addition, the generated current may be used for charging a battery 6 which is required for starting the PEM-cell 4 and/or the cracking system 10. A generator is not used in this system, since its function is carried out completely by the PEM-cell 4.

A process for operating the above-described system will be described in detail in the following. Since, during the generation of hydrogen, the liquid fuel is not completely decomposed but only a portion of the hydrogen is separated, the remaining fuel constituents must be utilized further. Several possibilities are available for this purpose. On the one hand, gaseous residues in the operation of the internal combustion engine 1 may be supplied to this utilization either directly or by way of the mixture forming device 16. On the other hand, they may also be buffered in the intermediate storage device 20, and supplied to the internal combustion engine 1 with a time delay either directly or again by way of the mixture forming device 16. In the latter case, it is also possible to utilize the residues from the intermediate storage device 20 only under predetermined operating conditions. If liquid constituents remain during the hydrogen separation, these can be supplied as a condensate to the fuel tank 2. However, care should be taken in this case that the fuel quality, particularly the ignitability, is not excessively impaired by the hydrogen separation.

The PEM-cell 4 may be operated for any length of time as long as the internal combustion engine is operating and sufficient fuel is available. However, the operation of the PEM-cell 4 is not limited, as in the case of a generator, to periods when the internal combustion engine 1 is operating. On the contrary, with this system, it is also possible to continue to generate electric energy when the internal combustion engine 1 is inoperative. Different concepts may be used for this purpose. In the case of a short interruption—within the range of a few minutes hydrogen can be generated in the cracking system 10 as long as the intermediate storage device 20 is filled by the remaining fuel constituents. In the case of medium interruptions—in the range of from 0.5 to 1.5 hours—the cracking system 10 can be switched off and the PEM-cell 4 can be supplied by means of hydrogen from the intermediate $H_2$-storage device.

Care should be taken in the latter case, however, that at least enough hydrogen remains in the intermediate $H_2$-storage device to permit a new start of the internal combustion engine 1. During longer interruptions, there remains the possibility of condensing the remaining fuel constituents and returning them into the fuel tank 2. However, in this case, the quality of the fuel in the fuel tank 2 must be monitored to assure sufficient ignitability. As a prerequisite of the operation of the PEM-cell 4 during a longer engine stoppage, it may be provided that the fuel tank must be sufficiently filled, for example, at least by 75%. The reason is that, when the filling level is not sufficient, there is the risk that, as the result of the separation of hydrogen, the ignitability of the remaining fuel is reduced to such an extent that it is no longer suitable for the combustion in the internal combustion engine 1.

In order to avoid this problem, for renewing the cracking capacity, suitable additives with easily boiling constituents may be added to the fuel tank 2. In this case, the cracking system 10 may be constructed to be relatively simple.

When the vehicle is started, the PEM-cell 4 may be supplied for a short time with hydrogen from the intermediate $H_2$-storage device 13, since the cracking system 10 will be started only after a predetermined operating time of the PEM-cell 4. Electric energy for starting the PEM-cell 4 and/or the cracking system 10 is preferably provided by a battery 6. In comparison to conventional batteries, in the case of such a system, as required, the battery 6 may be dimensioned to be correspondingly smaller.

In order to further improve the efficiency of the overall system, it is also possible to continuously adapt the power of the PEM-cell 4 to the requirements. Thus, the PEM-cell 4 must not be operated with a constant load but can be adjusted as a function of the required current. For this purpose, a control unit may be provided which gives the desired power of the PEM-cell 4 as a function of the number and the demand of the connected electric consuming devices 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In a motor vehicle, the combination comprising:
   an internal combustion engine for propelling said vehicle; and
   an electric supply system for providing electric power to electric consuming devices on said vehicle;
   wherein said electric supply system comprises in place of an electromechanical generator, a fuel cell system coupled to provide electric power to said electric consuming devices independently of operation of said internal combustion engine.

2. The combination according to claim 1, wherein said fuel cell system is fueled by fuel used for the internal combustion engine.

3. In a motor vehicle having an internal combustion engine for propelling said vehicle:
   an electric supply system for providing electric power to electric consuming devices on said vehicle;
   wherein said electric supply system comprises in place of an electromechanical generator, a fuel cell system coupled to provide electric power to said electric consuming devices independently of operation of said internal combustion engine.

4. The apparatus according to claim 3, wherein said fuel cell system is fueled by fuel used for the internal combustion engine.

* * * * *